(12) United States Patent
Mast et al.

(10) Patent No.: US 9,086,016 B2
(45) Date of Patent: Jul. 21, 2015

(54) FUEL DRAIN VALVE FOR A TURBINE ENGINE

(71) Applicant: Bell Helicopter Textron Inc., Fort Worth, TX (US)

(72) Inventors: Thomas M. Mast, Carrollton, TX (US); Joshua A. Edler, Colleyville, TX (US); Karl R. Burge, Euless, TX (US); Nicholas J. Plagianos, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 140 days.

(21) Appl. No.: 13/863,447

(22) Filed: Apr. 16, 2013

(65) Prior Publication Data

US 2014/0305135 A1   Oct. 16, 2014

(51) Int. Cl.
| | |
|---|---|
| *F02G 3/00* | (2006.01) |
| *F02C 7/232* | (2006.01) |
| *F02C 7/30* | (2006.01) |
| *F01D 25/00* | (2006.01) |
| *F02C 7/22* | (2006.01) |
| *F16K 31/60* | (2006.01) |

(52) U.S. Cl.
CPC ............. *F02C 7/232* (2013.01); *F01D 25/002* (2013.01); *F02C 7/222* (2013.01); *F02C 7/30* (2013.01); *F16K 31/602* (2013.01); *Y10T 137/86863* (2015.04)

(58) Field of Classification Search
CPC ......... F02B 77/04; B08B 9/00; F01D 25/002; F01M 11/04; F01M 11/0408; F05B 2260/602; F23D 2209/30; F02C 7/22

USPC ........... 134/169 A, 625.44, 625.45; 60/39.53, 60/39.091, 39.094

See application file for complete search history.

(56) References Cited

U.S. PATENT DOCUMENTS

| | | | |
|---|---|---|---|
| 3,352,112 A | 11/1967 | Chase | |
| 3,721,265 A | 3/1973 | Hoffland | |
| 5,385,014 A | 1/1995 | Rathbun | |
| 5,441,080 A * | 8/1995 | Baumann | 137/625.46 |
| 2001/0004828 A1* | 6/2001 | Nakamoto | 60/39.094 |

FOREIGN PATENT DOCUMENTS

DE   2120213 B   5/1972

(Continued)

OTHER PUBLICATIONS

European Search Report in related European Application No. 13172524.4, dated Dec. 13, 2013, 4 pages.

(Continued)

*Primary Examiner* — Gerald L Sung
(74) *Attorney, Agent, or Firm* — Noah A. Tevis

(57) ABSTRACT

A valve assembly for an engine, the valve assembly can include a housing; an in-flow port configured for connection with a drain line; a first out-flow port configured for connection with a fuel line; a second out-flow port configured for connection with a disposal line; and a passageway that is rotatable with a handle, the passageway being operable to redirect a flow of a fluid between the fuel line and the disposal line. The handle is configured to impede an attachment of the fluid source to a water wash connection when the passageway is in a position to direct the flow of the fluid from the drain line to the fuel line.

22 Claims, 3 Drawing Sheets

(56) References Cited

FOREIGN PATENT DOCUMENTS

| | | |
|---|---|---|
| DE | 20107715 U1 | 8/2001 |
| EP | 0762029 A2 | 3/1997 |
| EP | 2052792 A2 | 4/2009 |
| GB | 111538 | 12/1917 |
| GB | 742485 | 12/1955 |

OTHER PUBLICATIONS

Communication in related European Application No. 13172524.4, dated Jan. 10, 2014, 6 pages.

Canadian Office Action in related Canadian Application No. 2,848,694, dated Mar. 12, 2015, 4 pages.

* cited by examiner

FUEL DRAIN VALVE FOR A TURBINE ENGINE

BACKGROUND

1. Technical Field

The present disclosure relates to a fuel drain valve for a turbine engine.

2. Description of Related Art

A turbine engine can require the draining of excess fuel that would otherwise accumulate in the fuel manifold unit during the shutdown of the turbine engine. In one conventional system, the excess fuel drains into a bottle which must be emptied by maintenance personnel. The bottle and associated plumbing adds weight and consumes valuable space in the engine compartment. In another conventional system, the excess fuel is drained onto the ground instead of into a bottle; however, draining excess fuel onto the ground is a non-environmental practice that is not always permitted.

Hence, there is a need for an improved apparatus for dealing with excess fuel that may otherwise accumulate in the fuel manifold during the shutdown of a turbine engine.

DESCRIPTION OF THE DRAWINGS

The novel features believed characteristic of the apparatus of the present disclosure are set forth in the appended claims. However, the apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
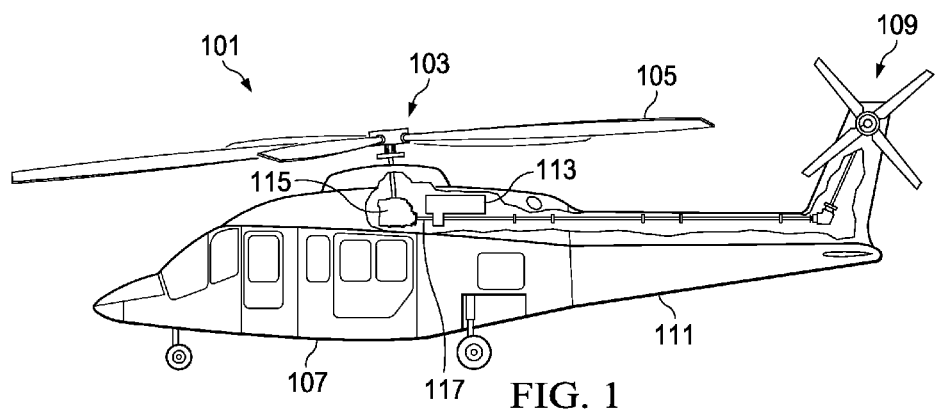
FIG. 1 is a side view of a rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111. Torque is supplied to rotor system 103 and anti-torque system 109 with at least one engine 113. A main rotor gearbox 115 is operably associated with an engine main output driveshaft 117 and the main rotor mast.

Rotorcraft 101 is merely illustrative of the wide variety of aircraft, vehicles, and other objects that are particularly well suited to take advantage of the apparatus of the present disclosure. It should be appreciated that any object having a turbine engine can utilize the apparatus of the present disclosure.

Figure 2:
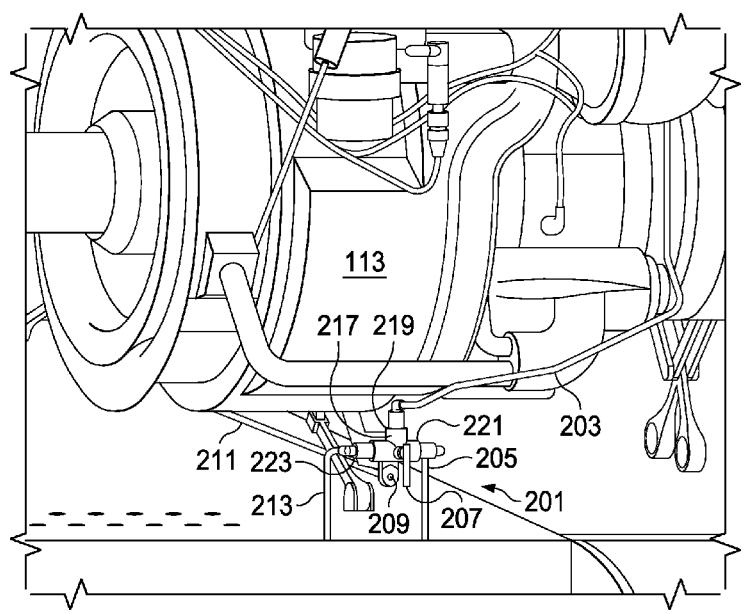
FIG. 2 is a perspective view of an engine with a valve assembly, according to one example embodiment.

Referring now also to FIG. 2, engine 113 is illustrated in further detail. Engine 113 is a turbine engine that includes one or more portions that may benefit from the occasional washing in a maintenance procedure. For example, a compressor portion of engine 113 can include a plurality of compressor blades that can become contaminated over a period of operation. For example, dust and other particles can become deposited on the blades, which can decrease performance of engine 113. As such, it can be especially desirable to wash the compressor blades so as to remove any undesired deposits. A water wash supply connection 209 is configured for attachment of an external fluid source for cleaning the compressor blades. It should be appreciated that the term "water wash" should be not be so narrowly construed to only include a water based fluid, but rather should be construed to include any appropriate fluid source sufficient for cleaning and flushing undesired deposits from within engine 113. In one example embodiment, connection 209 can include a threaded portion configured for coupling to the external fluid source. Further, connection 209 can include one or more seals configured for preventing leakage of the cleaning fluid at the connection 209. Connection 209 can be integral with valve assembly 201 such that a housing 217 forms a support for connection 209. In another embodiment, connection 209 is supported separate from housing 217 of valve assembly 201. It should be appreciated that one important feature includes the location of connection 209 in proximity of handle 207, as discussed further herein.

In one example embodiment, water wash connection 209 includes an opening that forms a port to a fluid line 211 that is fluid communication with a water wash system (such as water wash nozzles) within engine 113. An engine drain line 203 is configured to drain fluids from within engine 113. The exact location of the location of the engine side portion of drain line 203 is implementation specific. Further, engine drain line 203 can include a plurality of drain lines that drain from a plurality of locations within engine 113.

Still referring also to FIG. 2, a valve assembly 201 can include housing 217 having an in-flow port 219, a first out-flow port 221, and a second out-flow port 223. The in-flow port 219 provides fluid communication with drain line 203. The first out-flow port 221 provides fluid communication with fuel line 205. The second out-flow port 223 provides fluid communication with disposal line 213. Valve assembly 201 is configured for selectively redirecting fluid draining from drain line 203 to either a fuel line 205 or to a disposal line 213 by selective rotation of an internal passageway 215. The position of internal passageway 215 is selectively rotatable by a handle 207. In one example embodiment, internal passageway 215 is "L" shaped so that the rotation thereof can redirect fluid from drain line 203 between disposal line 213 and fuel line 205; however, it should be appreciated that the exact configuration of internal passageway 215 is implementation specific.

Disposal line 213 is configured as a fluid passageway for disposal fluids, as such; disposal line 213 is plumbed so that disposal fluids flow downstream from valve assembly 201 to a desired disposal area. In one example embodiment, disposal line 213 is plumbed to an engine deck where a scupper collects the disposal fluid and drains the disposal fluid out of the aircraft. In another embodiment, disposal line 213 is configured so that an external collection device can be connected thereto for collecting the disposal fluid.

Fuel line 205 is configured as a fluid passageway for engine fuel, as such; fuel line 205 is plumbed so that excess fuel from an engine shutdown flows to a fuel tank. As discussed further herein, excess fuel can be product of an engine shutdown; therefore, drain line 203 is plumbed to drain the excess fuel from engine 113 toward valve assembly 201 with fuel line 205 being downstream from valve assembly 201.

Figure 3:
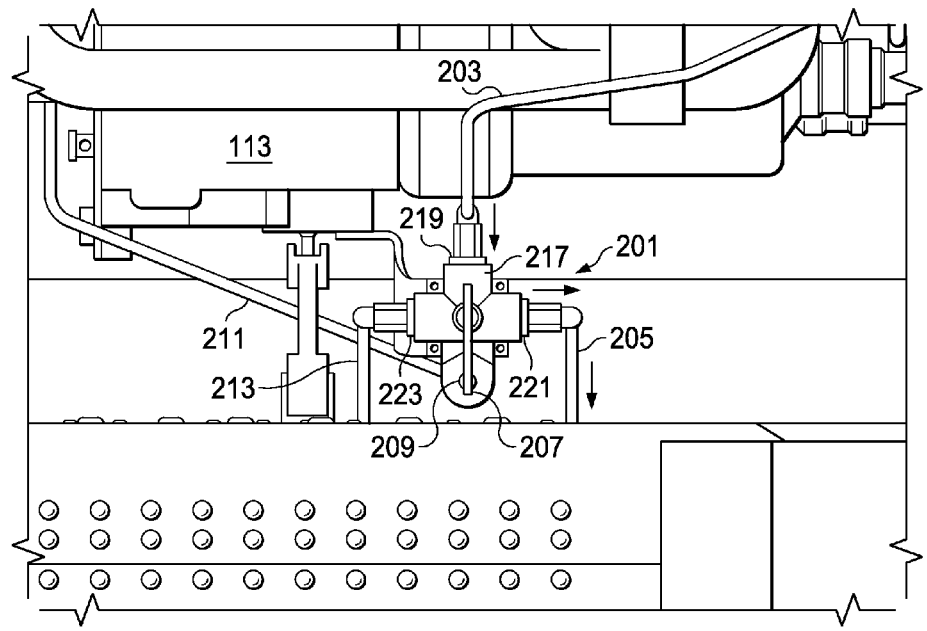
FIG. 3 is a side view of the valve assembly on the engine, with the valve assembly in the normal operation setting, according to one example embodiment.
Figure 4:
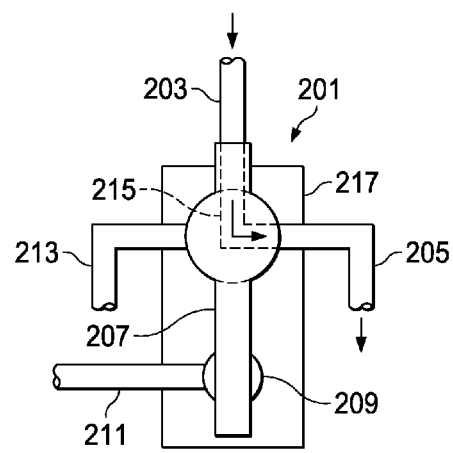
FIG. 4 is a partially stylized side view of the valve assembly on the engine, with the valve assembly in the normal operation setting, according to one example embodiment.

Referring now also to FIGS. 3-6, the operation of valve assembly 201 is illustrated in further detail. More specifically, valve assembly 201 is illustrated in the normal operation setting in FIGS. 3 and 4, while valve assembly 201 is illustrated in the water wash service setting in FIGS. 5 and 6. Referring first to FIGS. 3 and 4, one important feature of valve assembly 201 is that handle 207 includes an extended portion that blocks and prevents a user (such ground maintenance personnel) from attaching an external fluid source to water wash connection 209 when drain line 203 is in fluid communication with fuel line 205, which would cause water wash fluid to drain into a fuel tank. When handle 207 is oriented to prevent a connection of an external fluid source to water wash connection 209, passageway 215 allows for fluid communication between drain line 203 and fuel line 205. In such an orientation, handle 207 prevents the inadvertent contamination of the fuel system with the water wash fluid, but allows excess fuel from an engine shutdown to drain back into the fuel tank via fuel line 205.

Figure 5:
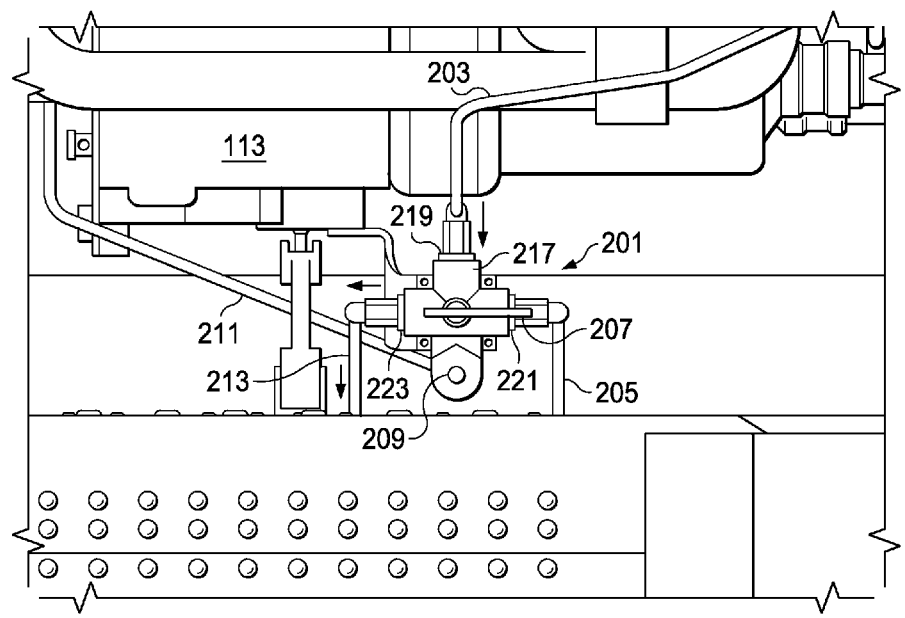
FIG. 5 is a side view of the valve assembly on the engine, with the valve assembly in the water wash service setting, according to one example embodiment.
Figure 6:
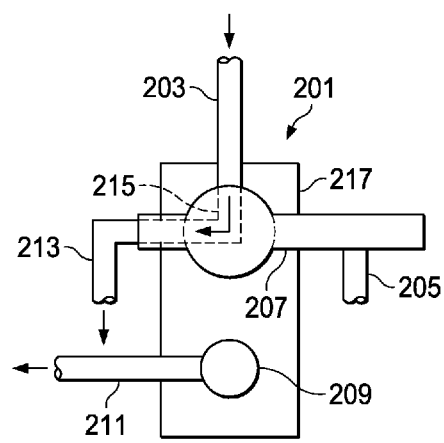
FIG. 6 is a partially stylized side view of the valve assembly on the engine, with the valve assembly in the water wash service setting, according to one example embodiment.

Referring now to FIGS. 5 and 6, handle 207 is illustrated in the water wash service setting in which passageway 215 is oriented to provide fluid communication between drain line 203 and disposal line 213. The position of handle 207 allows for the attachment of an external fluid source to water wash connection 209. During the water wash service operation, the water wash fluid is sprayed into engine 113 and drains out of engine 113 via drain line 203, then into valve assembly 201, and then into disposal line 213.

It should be appreciated that valve 201 can take on a wide variety of configurations. Further, it should be appreciated that the exact configuration of handle 207 is implementation specific. For example, handle 207 can be configured such that handle 207 must be rotated fully into the water wash service setting before water wash connection 209 is sufficiently exposed for a connection to an external fluid source.

The apparatus disclosed herein include one or more of the following advantages. The valve handle of the valve assembly is configured to prevent inadvertent contamination of the aircraft fuel system by not allowing an external fluid source to be connected while the valve passageway is oriented to provide fluid communication between the drain line and the fuel line. Further, the valve assembly allows for excess fluid generated from an engine shutdown to be drained to the aircraft fuel system, thereby preventing the need for a bottle or other fuel catching device. Further, the valve assembly eliminates any service action associated with emptying a fuel catching device. Further, the valve assembly prevents the draining of excess fuel onto a ground surface.

The particular embodiments disclosed herein are illustrative only, as the apparatus may be modified and practiced in different but equivalent manners apparent to those skilled in the art having the benefit of the teachings herein. Modifications, additions, or omissions may be made to the apparatus described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A valve assembly for an engine, the valve assembly comprising:
   a housing;
   an in-flow port configured for connection with a drain line;
   a first out-flow port configured for connection with a fuel line;
   a second out-flow port configured for connection with a disposal line;
   a passageway that is rotatable with a handle, the passageway being operable to redirect a flow of a fluid between the fuel line and the disposal line; and
   a water wash connection;
   wherein the handle impedes attachment of the fluid source to the water wash connection when the passageway is in a position to direct the flow of the fluid from the drain line to the fuel line.

2. The valve assembly according to claim 1, further comprising:
   wherein the handle allows for attachment of the fluid source to the water wash connection when the passageway is in a position to direct the flow of the fluid from the drain line to the disposal line.

3. The valve assembly according to claim 1, wherein the water wash connection includes a threaded portion.

4. The valve assembly according to claim 1, wherein the water wash connection is integral with the housing.

5. The valve assembly according to claim 1, wherein the water wash connection is separate from the housing.

6. The valve assembly according to claim 1, wherein the passageway is L shaped.

7. The valve assembly according to claim 1, wherein the drain line is connected to the engine for draining the fluid from the engine.

8. The valve assembly according to claim 1, wherein the fluid comprises a fuel.

9. The valve assembly according to claim 1, wherein the fluid comprises a water wash fluid.

10. A turbine engine comprising:
    a water wash system;
    a valve assembly comprising:
        an in-flow port configured for connection with a drain line;
        a first out-flow port configured for connection with a fuel line;
        a second out-flow port configured for connection with a disposal line;
    a passageway that is rotatable with a handle, the passageway being operable to complete a fluid path between either the drain line and the fuel line or alternatively between the drain line and the disposal line; and
    a connection for attaching a water wash fluid source.

11. The turbine engine according to claim 10, wherein the handle impedes attachment of the water wash fluid source to the connection when the passageway is in a position to complete a fluid path between the drain line and the fuel line.

12. The turbine engine according to claim 10, wherein the handle includes an elongated portion that impedes attachment of the water wash fluid source to the connection when the passageway is in a position to complete a fluid path between the drain line and the fuel line.

13. The turbine engine according to claim 10, wherein the connection includes a threaded portion.

14. The turbine engine according to claim 10, wherein the connection is integral with a housing of the valve assembly.

15. The turbine engine according to claim 10, wherein the connection is separate from a housing of the valve assembly.

16. The turbine engine according to claim 10, wherein the passageway is L shaped.

17. The turbine engine according to claim 10, wherein the fluid comprises a fuel.

18. The turbine engine according to claim 10, wherein the fluid comprises a water wash fluid.

19. The turbine engine according to claim 10, wherein the engine is an aircraft engine.

20. The turbine engine according to claim 19, wherein a portion of the fuel line downstream from the passageway is in fluid communication with a fuel tank of the aircraft.

21. The turbine engine according to claim 19, wherein a portion of the disposal line downstream from the passageway is in fluid communication with an engine deck of the aircraft.

22. The turbine engine according to claim 19, wherein a portion of the disposal line downstream from the passageway is configured for attachment to a disposal container.

\* \* \* \* \*